US011330263B1

(12) United States Patent
Wang et al.

(10) Patent No.: US 11,330,263 B1
(45) Date of Patent: May 10, 2022

(54) MACHINE LEARNING BASED CODED SIZE ESTIMATION IN RATE CONTROL OF VIDEO ENCODING

(71) Applicant: Synamedia Limited, Staines Upon Thames (GB)

(72) Inventors: Longji Wang, Waterloo (CA); Cheng-Yu Pai, Kitchener (CA); Stephen Warrington, Waterloo (CA)

(73) Assignee: Synamedia Limited, Staines Upon Thames (GB)

( * ) Notice: Subject to any disclaimer, the term of this patent is extended or adjusted under 35 U.S.C. 154(b) by 0 days.

(21) Appl. No.: 17/177,173

(22) Filed: Feb. 16, 2021

Related U.S. Application Data

(60) Provisional application No. 63/121,126, filed on Dec. 3, 2020.

(51) Int. Cl.
*H04N 19/124* (2014.01)
*H04N 19/577* (2014.01)
*H04N 19/196* (2014.01)
*H04N 19/176* (2014.01)
*H04N 19/149* (2014.01)

(52) U.S. Cl.
CPC ......... *H04N 19/124* (2014.11); *H04N 19/149* (2014.11); *H04N 19/176* (2014.11); *H04N 19/196* (2014.11); *H04N 19/577* (2014.11)

(58) Field of Classification Search
CPC .. H04N 19/124; H04N 19/149; H04N 19/176; H04N 19/196; H04N 19/577
USPC .................................................. 375/240.03
See application file for complete search history.

(56) References Cited

U.S. PATENT DOCUMENTS

| 2019/0014320 | A1* | 1/2019 | Navarrete Michelini | ................... H04N 19/61 |
| 2020/0344467 | A1* | 10/2020 | Murra | ................... H04N 19/124 |
| 2021/0067785 | A1* | 3/2021 | Zhang | ................... H04N 19/179 |
| 2021/0158008 | A1* | 5/2021 | Zhou | ................... G06K 9/6271 |

OTHER PUBLICATIONS

Mai Xu et al., "Reducing Complexity of HEVC: A Deep Learning Approach," IEEE Transactions on Image Processing, vol. 27, No. 10, 2018, pp. 5044-5059.

(Continued)

*Primary Examiner* — Allen C Wong
(74) *Attorney, Agent, or Firm* — Fernando & Partners, LLP (57) ABSTRACT

Techniques for machine learning based coded size estimation in rate control of video encoding are described. An encoder in accordance with various embodiments uses one or more machine learning approaches to facilitate the rate control of video encoding. When training one or more neural network models, the relationship between the coded size and unit characteristics (e.g., picture pixels and/or picture features) is learned from past encoding. The encoder then uses the trained model(s) to estimate the coded size through model inference with improved accuracy. In some embodiments, the trained model(s) are integrated into the encoder for direct model inference. The direct model inference reduces the overhead of referencing application programming interfaces (APIs) provided by a separate machine learning platform, thus making the rate control methods and systems described herein useful in real time video encoding.

20 Claims, 8 Drawing Sheets

(56) References Cited

OTHER PUBLICATIONS

Ye Li et al., "A Convolutional Neural Network-Based Approach to Rate Control in HEVC Intra Coding," 2017 IEEE Visual Communications and Image Processing (VCIP), 2017, pp. 1-4.
Bin Li et al., "λ Domain Rate Control Algorithm for High Efficiency Video Coding," IEEE Transactions on Image Processing, vol. 23, No. 9, Sep. 2014, pp. 3841-3854.

\* cited by examiner

MACHINE LEARNING BASED CODED SIZE ESTIMATION IN RATE CONTROL OF VIDEO ENCODING

CROSS-REFERENCE TO RELATED APPLICATION

This application claims priority to U.S. provisional patent application No. 63/121,126 filed on Dec. 3, 2020, the contents of which are hereby incorporated by reference.

TECHNICAL FIELD

The present disclosure relates generally to video encoding and, more specifically, to machine learning based coded size estimation in rate control of video encoding.

BACKGROUND

Rate control is crucial in video encoding. During video encoding, the encoder distributes bits among pictures at a rate that complies with buffer verification. Thus, one essential part of rate control in video encoding is to accurately estimate the coded size for a given picture at a certain quantization parameter (QP).

Accurate coded size estimation ensures that a target QP is assigned to an encoding picture through some mechanisms (e.g., according to a look-ahead buffer model) without causing buffer underflow or overflow. On one hand, severe underestimation results in buffer underflow or invokes a buffer underflow prevention scheme. On the other hand, severe overestimation results in buffer overflow, thus wasting bandwidth with stuffing bits. Accordingly, the accuracy of coded size estimation directly impacts encoding quality as well as encoder performance.

Currently, encoders use various estimation methods for coded size estimation and rate control. For example, some estimation methods used by various encoders assume a nonlinear relationship between the coded size and the QP. However, the relationship between the coded size and complexity of a picture may not be direct. Further, the relationship may change when the subject matter of a video changes. Thus, previously existing coded size estimation methods are often less accurate.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

OVERVIEW

In accordance with some embodiments, the machine learning based coded size estimation in rate control of video encoding described herein outperforms previously existing coded size estimation methods and systems. An encoder in accordance with various embodiments uses one or more machine learning approaches to facilitate the rate control of video encoding. When training one or more neural network models, the relationship between the coded size and unit characteristics (e.g., picture pixels and/or picture features) is learned from past encoding. The encoder then uses the trained model(s) to estimate the coded size through model inference with improved accuracy. In some embodiments, the trained model(s) are integrated into the encoder for direct model inference. The direct model inference reduces the overhead of referencing application programming interfaces (APIs) provided by a separate machine learning platform, thus making the rate control methods and systems described herein useful in real time video encoding.

In accordance with various embodiments, a rate control method in video encoding is performed at an encoder with a processor and a non-transitory memory. The method includes obtaining a unit from a raw video. The method also includes estimating a coded size of the unit by applying a neural network to the unit, wherein inputs to the neural network include one or more of features associated with the unit, the unit, and a quantization parameter for compressing the unit. The method additionally includes encoding the unit at a rate based on the coded size of the unit.

EXAMPLE EMBODIMENTS

The machine learning based coded size estimation methods, systems, and devices described herein solve the aforementioned rate control issues in video encoding. In some embodiments, the machine learning based coded size estimation uses one or more machine learning approaches to control the rate of video encoding. The coded size estimation can be applied to any video codec, e.g., Advanced Video Coding (AVC), High Efficiency Video Coding (HEVC), Versatile Video Coding (VVC), and/or MPEG-2, etc.

Machine learning, especially artificial neural network (ANN) based machine learning, is the foundation for many modern artificial intelligence (AI) applications. A multilayer perceptron (MLP) is a class of a feedforward ANN that includes input layer(s), hidden layer(s), and output layer(s). The hidden layers are typically fully connected dense layers. MLP-based models often utilize supervised learning techniques for training, and explicit features are provided for MLP model training and inference. A convolutional neural network (CNN) is another variant of ANN where the hidden layers of the network include convolutional layers, pooling layers, normalization layers, and fully connected layers. Convolutional layers typically play the role of extracting features for supervised learning.

In one embodiment, a CNN model is trained to estimate the coded size based on down-sampled pixel values of a given picture and the corresponding quantization parameters (QPs). The training data can be generated online or offline from the targeted encoder. In some embodiments, the trained CNN model is integrated into the encoder for efficiency and a model reference is executed to estimate the coded size by the rate control.

In another embodiment, to reduce the computational complexity of CNN model inference, a multilayer perceptron (MLP) model is trained to estimate the coded size based on picture features that impact the coded size such as QP, picture type, picture complexity, pixel DC value, and/or histogram of macroblock level statistics, etc. In some embodiments, like the CNN model, the trained MLP model is integrated into the encoder for enhanced performance and an MLP model reference is executed to estimate the coded size by the rate control.

Without involving pixel wise convolution, the MLP model inference described herein in accordance with some embodiments takes significantly less computational cycles than the CNN model inference described herein for a comparable model performance. In some embodiments, to further improve the estimation accuracy in the MLP approach, macroblock level histogram is incorporated into the model input. In both CNN and MLP models, the direct model inference reduces the overhead of using API provided by a separate machine learning platform, thus making the machine learning based size estimation described herein useful in real video encoding.

Figure 1A:
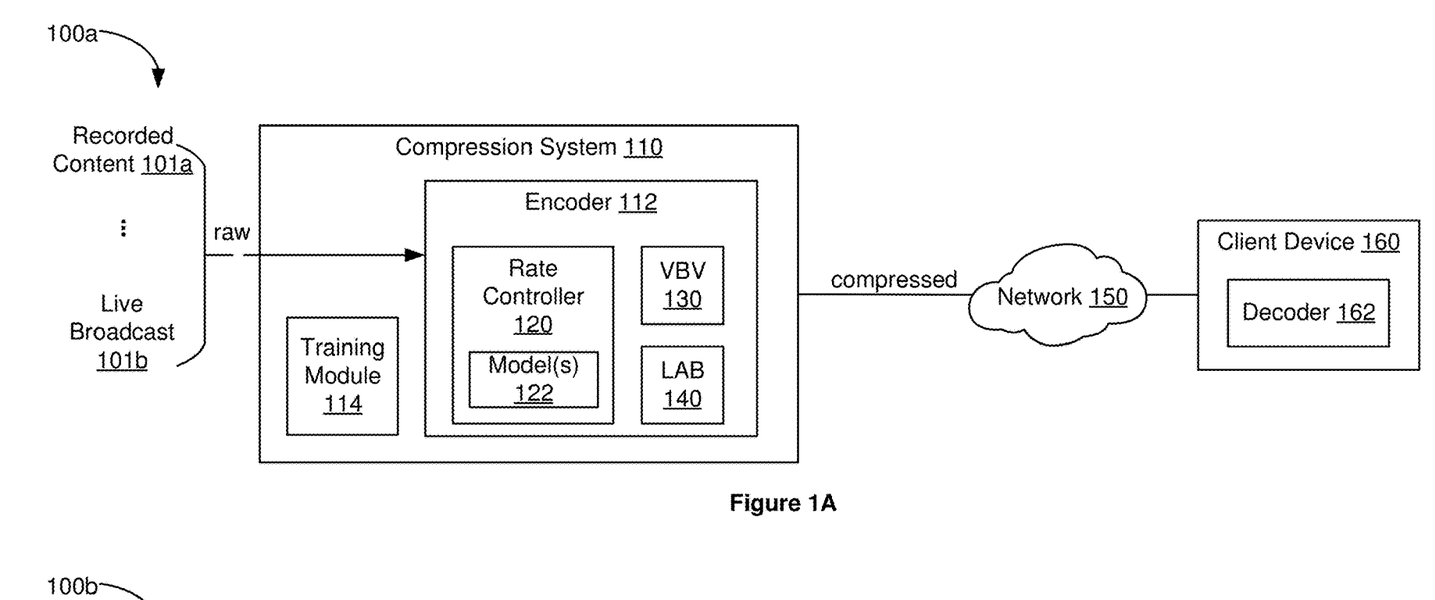
FIG. 1A is a block diagram of an exemplary media processing system, in accordance with some embodiments.

Reference is now made to FIG. 1A, which is a block diagram of an exemplary media processing system 100a in accordance with some embodiments. Digital video processing consumes large amount of storage and network capacity. As such, many computers and computer networks lack the resources to process raw digital video. For this reason, engineers use compression (also referred to as coding or encoding) to reduce the bitrate of digital video. Compression decreases the cost of storing and transmitting video by converting the video into a lower bitrate form. Decompression (also referred to as decoding) reconstructs a version of the original video from the compressed form.

As shown in FIG. 1A, in preparation for video transmission, an exemplary compression system 110 in the context of the media processing system 100a obtains raw (e.g., uncompressed) media content, such as recorded content 101a and/or live broadcast 101b, collectively referred to hereinafter as raw content 101. The compression system 110 then compresses the raw content 101 with an encoder 112 and transmits the compressed media content over at least one network 150. In some embodiments, at least one client device 160 receives the compressed media content via the at least one network 150. In some embodiments, the client device 160 includes at least a decoder 162 (e.g., a controller and/or a processor) for decoding the compressed media content, a buffer (e.g., as part of a non-transitory memory) for storing at least a portion of the media content to facilitate the decoding, and/or a player for outputting the decoded media content.

Though FIG. 1A illustrates a single client device 160, the media processing system 100a may include one or more client devices 160 for receiving the compressed media content. Likewise, the system 100a may include one or more compression systems 110, e.g., one or more servers, and the compression system 110 may include one or more encoders 112. For the sake of simplicity, the subject matter will be described hereinafter for the most part with reference to a single client device 160, a single compression system 110, and a single encoder 112. Thus, references herein to the client device 160, the compression system 110, and the encoder 112 in the single form cover embodiments where there is a single client device 160, compression system 110, and encoder 112 as well as embodiments where there is a plurality of client devices 160, compression systems 110, and encoders 112.

In some embodiments, to compress the raw content 101, the compression system 110 includes an encoder 112 to code the raw content 101. The encoder 112 can be implemented by appropriate hardware, software, and/or firmware to perform the encoding, e.g., at a device with one or more processors and a non-transitory memory. A variety of media content according to a variety of formats can be encoded, packaged, and transmitted by the compression system 110. For example, standard definition (SD) services tend to use MPEG-2 for video encoding, while high definition (HD) services tend to use AVC or H.264 for video encoding. In another example, ultra high definition (UHD) services tend to use HEVC for video encoding. The exemplary compression system 110 as well as the machine learning based coded size estimation described herein can be used with any definition, e.g., SD, HD, and/or UHD, etc., and any codec, e.g., MPEG-2, AVC/H.264, HEVC/H.265, and/or VVC/H.266, etc.

In some embodiments, the encoder 112 includes a rate controller 120 that uses machine learning based coded size estimation for rate control of video encoding. In video coding, the rate controller 120 selects a picture level quantization parameter (QP) for each picture to maintain a desired bitrate. The number of bits in each picture varies due to the different types of picture processing, as well as the inherent variation with time of the spatial-temporal complexity of the scene being coded. The fluctuation, as explained above, can cause buffer overflow or underflow. In some embodiments, to control the bitrate and bound the short-term deviation from a target allocation, the encoder 112 simulates a decoder's video buffering verifier (VBV) 130 model along with a look-ahead buffer (LAB) 140. One task of the rate controller 120 is to estimate the coded sizes of the pictures in the LAB 140 for a given QP and model future buffering level in the VBV. The buffering level in the VBV 130 is in turn used to adjust the QP to prevent the VBV 130 from underflows and/or overflows, thus maintaining the desired bitrate to transmit the compressed media content to the client device 160 via the network 150.

In some embodiments, a training module 114 generates and maintains trained model(s) 122 by applying one or more neural network models to learn and train the relationship between the coded size and picture characteristics for coded size estimation. Examples of such picture characteristics include picture pixels in a CNN model and/or picture features in an MLP model. Once trained, the rate controller 120 uses the trained model(s) 122 to estimate coded size through model inference. As will be described below, the machine learning based coded size estimation method in accordance with various embodiments improves the estimation accuracy and outperforms previously existing estimation methods, systems, and devices. In some embodiments, the trained model(s) 122 are integrated into the encoder 112 for direct model inference. The integration improves efficiency and makes the machine learning based coded size estimation approach described herein useful in real time video encoding.

It should be noted that the compression system 110 can include more, less, and/or different elements than shown in FIG. 1A. For example, the training module 114 can be a part of or separate from the compression system 110. In another example, the compression system 110 can include one or more network interfaces and/or transmitters for transmitting the compressed media content to the client device 160 via the network 150. Further, each of the elements in the compression system 110 can include appropriate hardware, software, and/or firmware to perform the operations attributed to the element herein. Operation(s) attributed to an element in the compression system 110 herein should not be considered binding and in some embodiments, other element(s) in the exemplary system 110 may additionally or alternatively perform such operation(s).

Figure 1B:
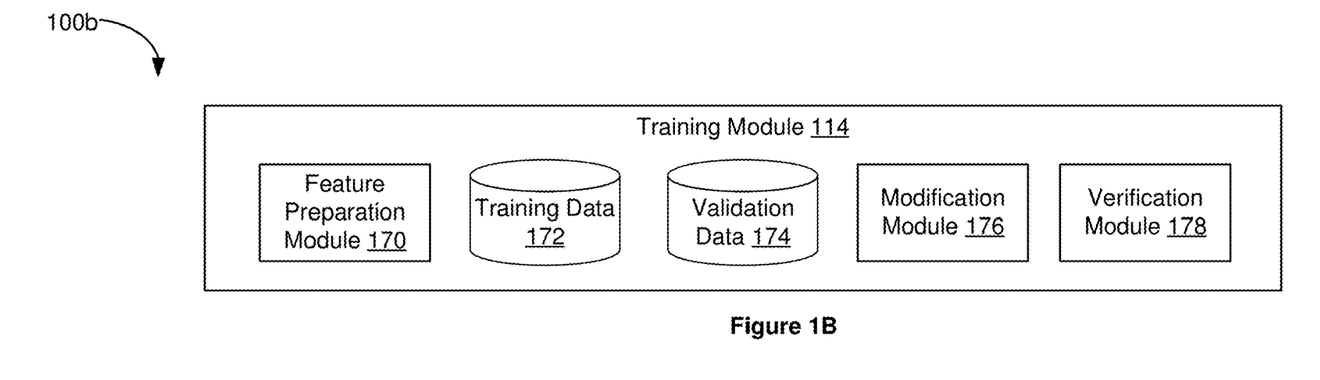
FIG. 1B is a block diagram of an exemplary neural network model training module, in accordance with some embodiments.

FIG. 1B is a diagram 100b illustrating the training module 114 in accordance with some embodiments. In some embodiments, the training module 114 includes a feature preparation module 170 for identifying, selecting, extracting, and/or synthesizing features as inputs to one or more neural network models. Having determined the features, a target encoder (e.g., the encoder 112 in FIG. 1A) is modified to generate a training dataset 172 and a validation dataset 174 for different picture types in accordance with some embodiments. In some embodiments, the training dataset 172 and the validation dataset 174 are generated by encoding training video sequences and holdout validation video sequences at different bitrates and throttle levels. In some embodiments, for the encoded pictures, the actual coded sizes are collected and used by a modification module 176 as the training labels (e.g., the ground truth) and by a verification module 178 as the test labels during the supervised learning process. During the iterative training process, the modification module 176 updates model parameters to achieve a competitive estimation accuracy by the neural network model. In some embodiments, the modification module 176 coordinates with other modules in the training module 114 to select pertinent features for model training and inference.

It should be noted that the training module 114 can include more, less, and/or different elements than shown in FIG. 1B. For example, the training dataset 172 and/or the validation dataset 174 can be generated online or offline from the targeted encoder and can be stored as part of the training module 114 (e.g., in a non-transitory memory) or separately. Further, each of the elements in the training module 114 can include appropriate hardware, software, and/or firmware to perform the operations attributed to the element herein, e.g., with one or more processors and a non-transitory memory for storing the training dataset 172 and/or the validation dataset 174. Operation(s) attributed to an element in the training module 114 herein should not be considered binding and in some embodiments, other element(s) in the training module 114 may additionally or alternatively perform such operation(s).

Figure 2:
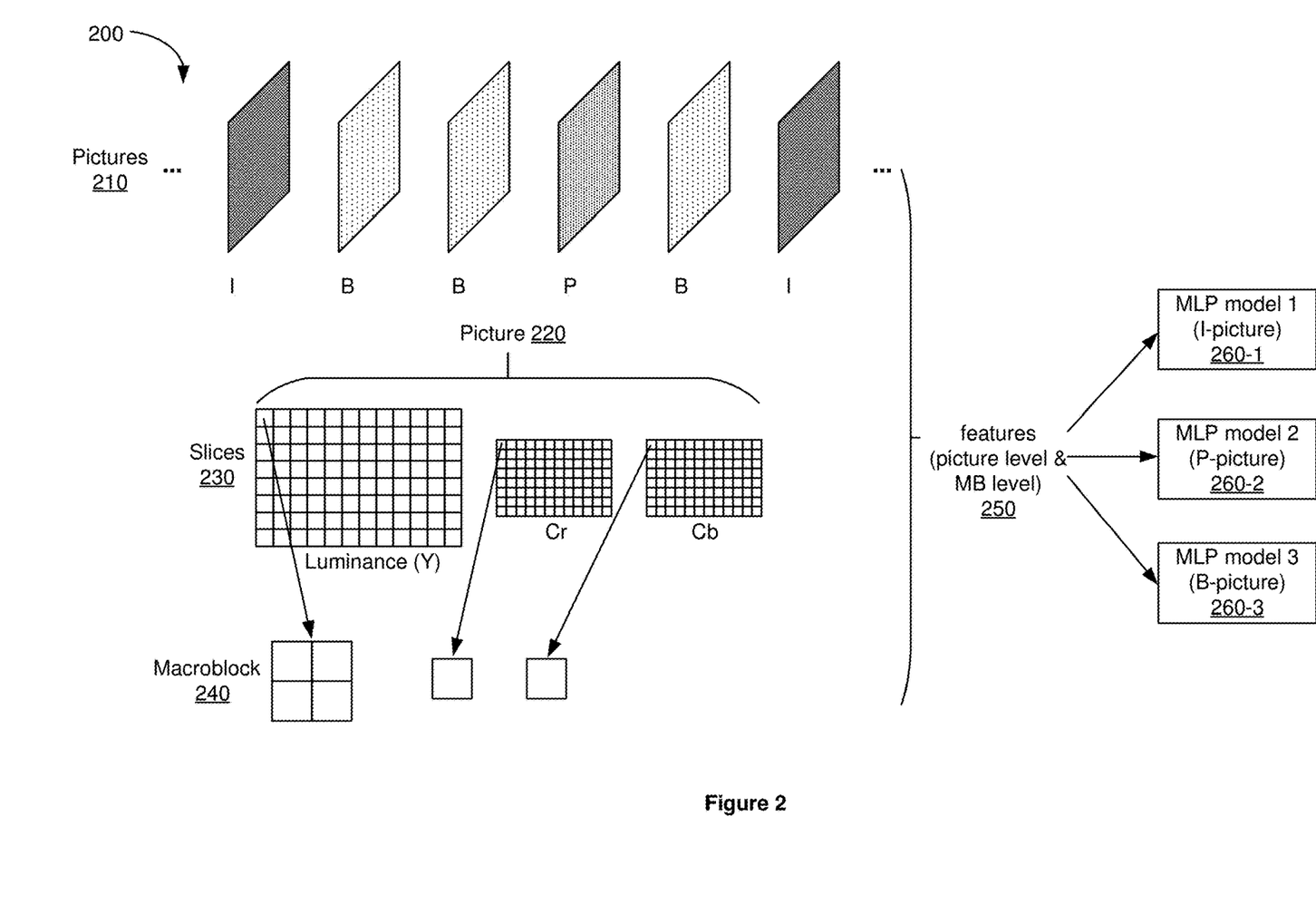
FIG. 2 is a diagram illustrating feature selection for machine learning based coded size estimation, in accordance with some embodiments.

FIG. 2 is a diagram 200 illustrating feature selection for machine learning based coded size estimation in accordance with some embodiments. The feature selection process shown in FIG. 2 is performed by the compression system 110 in accordance with some embodiments. As explained above with reference to FIG. 1A, during encoding, a data object, including but not limited to a video sequence, is compressed to a coded representation for transmission. A raw digital video sequence can include many frames per second, e.g., 24 frames per second (fps), 25 fps, 30 fps, 60 fps, or 120 fps, etc., and each picture or frame can include tens or hundreds of thousands of pixels. A pixel represents a tiny element of a picture. Thus, the number of bits per second, or bitrate, of a raw digital video sequence may be many million bits per second or more. To reduce the bitrate of digital video, the compression system 100 (FIG. 1A) packages a video stream and possibly other bit streams in a layered stream. Within the video layer of the layered stream, as shown in FIG. 2, the compressed data is further layered. The layers pertain to the operation of the compression scheme as well as the composition of the compressed bit stream.

One video layer shown on top of FIG. 2, e.g., a pictures layer 210, includes sets of consecutive units, each is known as a Group of Pictures (GOP). Within a GOP, three types of pictures can appear. The distinguishing feature among the picture types is the compression method used. Intramode pictures (I-pictures) are compressed independently. Although there is no fixed upper bound on the distance between I-pictures, it is expected that they are interspersed throughout a sequence to facilitate random access, other special modes of operation, and/or scene change. Predictively motion-compensated pictures (P-pictures) are reconstructed from the compressed data in that picture and recently reconstructed pictures from previously displayed I- or P-pictures. Bidirectionally motion-compensated pictures (B-pictures) are reconstructed from the compressed data in that picture plus reconstructed pictures from previously displayed I- or P-pictures and reconstructed pictures from I- or P-pictures that will be displayed in the future.

Below the pictures layer 210 is a single unit (e.g., a single picture 220) as shown in the middle of FIG. 2. Each unit 220 includes tens or hundreds of thousands of pixels. In raw form, a computer commonly represents a pixel in a picture as a set of samples. For instance, a pixel may comprise an 8-bit luminance sample that defines the grayscale component of the pixel (also referred to as the luminance component or the Y-component) and two 8-bit chrominance sample values that define the color component of the pixel (also referred to the color difference components or Cr for red color difference and Cb for blue color difference). The luminance component of each picture is subdivided into multiple regions. The color difference components are subdivided into appropriately sized blocks that are spatially co-situated with the luminance regions. Taken together, these co-situated luminance region and color difference regions make up the next layer, known as a macroblock (MB) level 240. Macroblocks in a picture can be numbered consecutively in raster scan order. Many encoding techniques divide a picture within the video sequence into slices 230 to form a slice layer between the single picture layer 220 and the MB level 240. A slice often includes one or more contiguous rows of macroblocks in their original left-to-right order.

During encoding, given a QP, the coded size depends on many factors, such as picture type, picture complexity, QP modulation (e.g., due to adaptive quantization), coding tools used (e.g., due to throttling control), efficiency of motion estimation, etc. Different picture types (e.g., I-, P-, and B-picture) involve different coding tools and have different statistics. In some embodiments, an MLP model is built for each picture type and the feature selection varies for different picture types. For example, in FIG. 2, MLP model 1 260-1 is built for I-picture, MLP model 2 260-2 is built for P-picture, and MLP model 3 260-3 is built for I-picture, etc.

For all picture types, in some embodiments, a plurality of picture-wise statistics is selected as part of features 250 for model training and inference. In some embodiments, the plurality of picture-wise statistics includes picture format (e.g., progressive or interlaced), resolution type (e.g., SD or HD), encoding throttle level, picture complexity (e.g., pixel activity), pixel variance, pixel direct current (DC) value, ratio of picture intra complexity over inter complexity of the temporal prediction, and/or picture QP, among others. Other features can be used in place of or in addition to the picture-wise features described herein as part of the features 250. Due to different resolutions, one or more of the plurality of picture-wise statistics, e.g., the picture complexity and pixel variance are normalized to the MB level 240 while other picture-wise statistics or features are at the picture level 220 in accordance with some embodiments.

In some embodiments, through an iterative, continuous, and/or periodical development process, one or more features are selected (e.g., by the training module 114, FIGS. 1A and 1B) to achieve a competitive estimation accuracy for MLP-based model training and inference. In some embodiments, statistics from the MB level 240, e.g., adaptive quantization scores, are created and generated as features for the MLP-based model. For instance, a macroblock-tree (MB-tree) is widely used in encoder optimization, which estimates the amount of information that each MB contributes to the prediction of future pictures. In some embodiments, for I- and P-pictures, a histogram of MB-tree scores is generated as the adaptive quantization score for model training and inference. For B-pictures, where an MB-tree score is not available, a histogram of intra-inter-ratio (ratio of intra complexity over inter complexity) at MB level is generated as the adaptive quantization score for model training and inference, in accordance with some embodiments. In some embodiments, a histogram with 16 or 32 bins is chosen for the best estimation performance. It should be noted that other forms of temporal adaptive quantization can generate a similar score for the histograms. Further, histograms of different macroblock level features are one embodiment of macroblock level features. Other macroblock level features can be used in place of or in conjunction with histograms.

Figure 3:
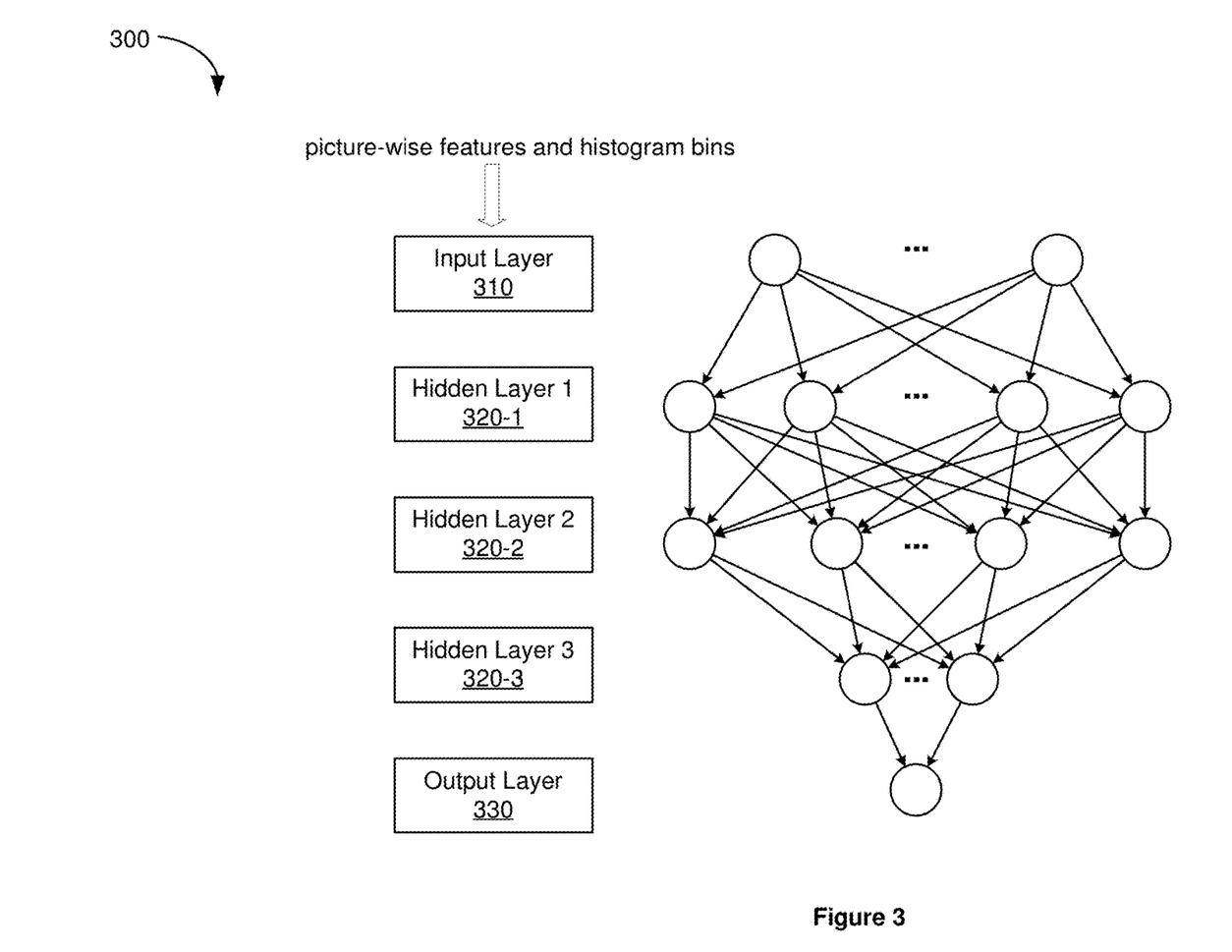
FIG. 3 is a diagram illustrating an exemplary five-layered multilayer perceptron (MLP) neural network for coded size estimation, in accordance with some embodiments.

FIG. 3 illustrates an exemplary five-layered MLP neural network 300 for coded size estimation in accordance with some embodiments. In some embodiments, the MLP neural network 300 includes one input layer 310, three hidden layers (e.g., hidden layer 1 320-1, hidden layer 2 320-2, and hidden layer 3 320-3, collectively referred to hereinafter as the hidden layers 320), and one output layer 330. In one example, the input dimension is 24×1, e.g., for receiving 8 picture-wise features and 16 histogram bins. In another example, the first two hidden layers 320-1 and 320-2 are dense layers, each with 32 nodes, and the third hidden layer 320-3 is a dense layer with 8 nodes. In such examples, in total, there are 2129 trainable parameters in the exemplary MLP neural network 300. In some embodiments, the rectified linear activation function (ReLU) is applied to the output of each hidden layer 320 and the output layer 330.

In some embodiments, TensorFlow is adopted as the machine learning platform for model training. Other machine learning platforms can be used in place of or in conjunction with TensorFlow. To reduce model overfit, in some embodiments, a few approaches supported by Tensor-Flow can be employed during the training, e.g., weight constraint (e.g., constraint the magnitude of weights to be below a limit), noise (e.g., applying additive zero-centered Gaussian noise as regularization layer), and/or early stopping (e.g., ceasing training when performance degrades on the validation dataset). During the training, in some embodiments, Adam (adaptive moment estimation) is used as the stochastic optimization with a learning rate of 0.01 and decay rate of 0.01/200. In some embodiments, a batch size of 32 is adopted throughout the training.

In some embodiments, after the MLP model 300 has been trained, the encoder (e.g., the encoder 112, FIG. 1A) applies the trained model to video encoding for coded size estimation through model inference. TensorFlow provides C API for model inference. However, the overhead of calling TensorFlow API for model inference is too high to be useful in real time video coding. It costs millions of cycles for one model inference using the built MLP model. It also costs roughly 200K processor clock cycles for one model inference with converted TensorFlow Lite model at a reduced precision. To make MLP-based coded size estimation useful in real time video encoding, in some embodiments, the MLP model 300 is integrated with the encoder (e.g., the model(s) 122 as part of the encoder 112, FIG. 1A), so that the video encoder invokes model inference directly. In other words, the encoder can access the trained MLP model without calling any language binding APIs provided by machine learning platforms. For the integration, the trained model parameters are outputted to C or other programming language's header files in some embodiments. The encoder then performs direct model inferencing based on the raw model parameters and known model structure on the input features. In some embodiments, with C code implementation, one model inference with the trained MLP model only costs 30K cycles. Further, in some implementations, with Advanced Vector Extensions (AVX) optimization for processors, one model inference only takes 6K cycles, which is well acceptable in real time video encoding.

Figure 4:
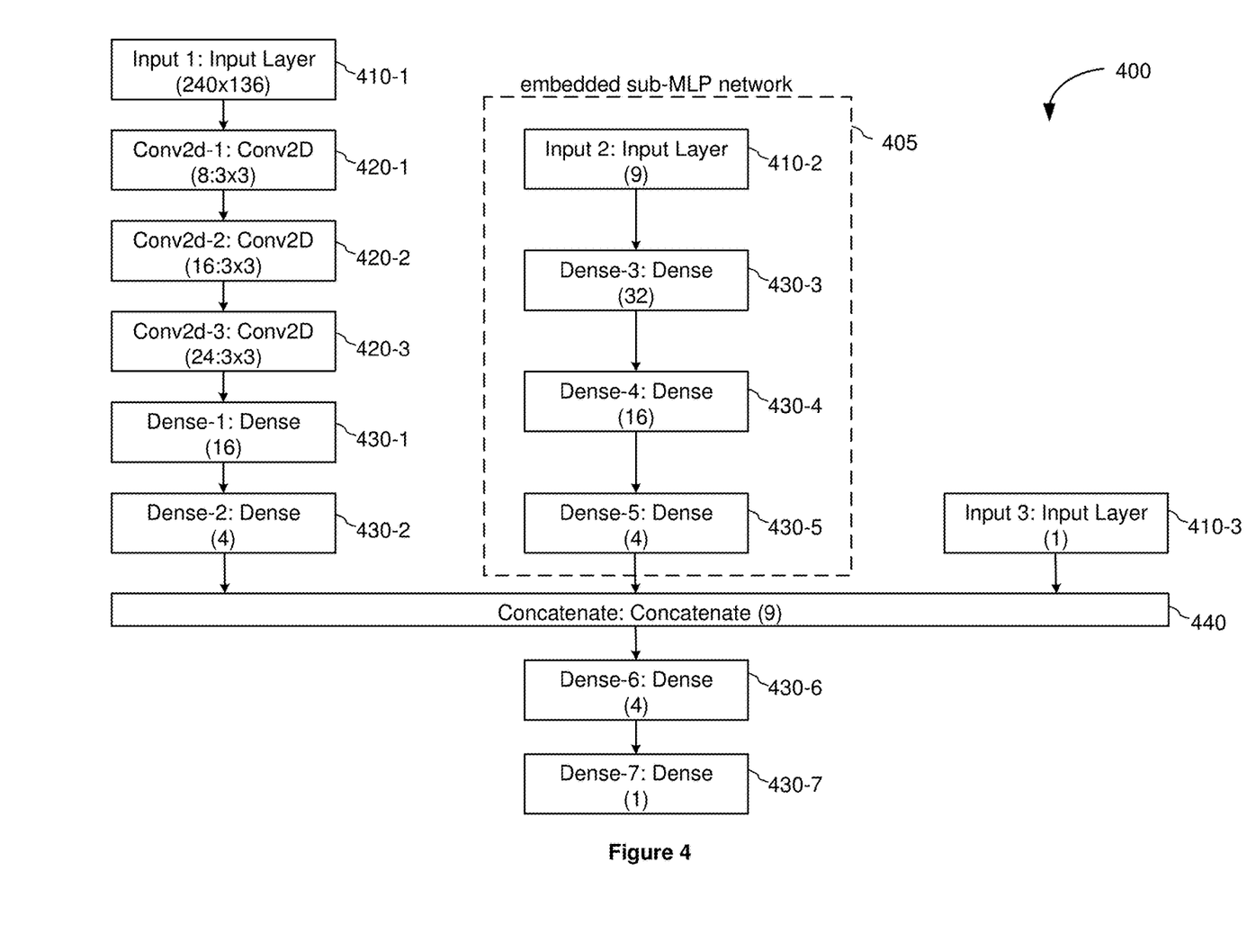
FIG. 4 is a diagram illustrating an exemplary convolutional neural network (CNN) based model with an embedded sub-MLP network for coded size estimation, in accordance with some embodiments.

FIG. 4 is an exemplary CNN-based model 400 with an embedded sub-MLP network 405 for coded size estimation in accordance with some embodiments. For MLP-based model, as described above with reference to FIGS. 2 and 3, explicit features are identified and provided for model training and inference. The prediction performance depends on available features and feature selection. In contrast, in CNN-based machine learning approaches, convolutional layers 420 are employed to extract features from inputs (e.g., the input pixels or prediction residues to input layer 1 410-1) and to extract deep features from the outputs of previous convolutional layers. In some embodiments, each convolutional layer 420 includes convolution, batch normalization, and max pooling sublayers.

In the exemplary CNN-based model 400, three convolutional layers 420, e.g., convolutional layer 1 420-1, convolutional layer 2 420-1, and convolutional layer 3 420-3, are employed to extract features. In some embodiments, the inputs to the input layer 1 410-1 include an input picture (e.g., pixel values) as the raw input for I-picture and/or motion compensated prediction for P- or B-pictures. In some embodiments, the luminance component of the picture is used as the raw input to reduce the computational complexity. In some embodiments, to further reduce the computational complexity from processing full resolution pixel or prediction residue, a 4× or 8× down-sampled picture is used at the input layer 1 410-1. In one example, for videos with a resolution of 1920×1080, the input luminance or residue is down-sampled to 240×136 at the input layer 1 410-1, as shown in FIG. 4, and then fed to the first convolution layer 420-1. Continuing the example, for feature extraction, convolutional layer 1 420-1 can include 8 filters and the size of each filter is 3×3; convolutional layer 2 420-2 can include 16 filters and the size of each filer is 3×3; and convolutional layer 3 420-3 can include 24 filters and the size of each filter is 3×3. The outputs of the third convolutional layer 420-3 are flattened before feeding to two fully connected layers (e.g., dense layer 1 430-1 with 16 nodes and dense layer 2 with 4 nodes). Unlike MLP-based coded size estimation, where the resolution dependent statistics are normalized to MB level and a single model is trained for different resolutions, a separate model is trained for different resolutions and/or codec in CNN-based coded size estimation.

In some embodiments, the embedded sub-MLP network 405 uses similar picture-wise features as in MLP-based model 300 (FIG. 3) as inputs to input layer 2 410-2, but does not use MB-level histogram statistics as part of the input features. As such, CNN-based modeling can be used when there is no pertinent histogram statistics available from the encoder. In one example, to process videos with a resolution of 1920×1080, nine picture-wise features are provided to the sub-MLP network 405 in the exemplary CNN-based model 400, e.g., as inputs to input layer 2 410-2. Such picture-wise features include picture format (e.g., progressive or interlaced), encoding throttle level, picture complexity (e.g., pixel activity), pixel variance, pixel DC value, ratio of picture intra complexity over inter complexity of the temporal prediction, picture QP, camera flash tag, and fading tag. Other features may be used in place of or in addition to the picture-wise features described herein.

The embedded sub-MLP network 405 also includes three fully connected layers, e.g., dense layer 3 430-3 with 32 nodes, dense layer 4 430-4 with 16 nodes, and dense layer 5 430-5 with 4 nodes. The outputs from dense layer 2 430-2 and the embedded sub-MLP network 405 are concatenated along with QP (as an input to input layer 3 410-3) in a concatenation layer 440 and fed to two more fully connected layers (e.g., dense layer 6 430-6 with 4 nodes and dense layer 7 with 1 node). In total, there are 98029 trainable parameters in this model. Like MLP-based coded size estimation models, the exemplary CNN-based model 400 is separately built and trained for each picture type.

In some embodiments, as in MLP-based model training, weight constraint, Gaussian noise and early stopping are used to reduce the overfit during CNN-based model training. Again, Adam is used as the stochastic optimization with a learning rate of 0.01 and decay rate of 0.01/200 in accordance with some embodiments. In some embodiments, batch size of 32 is adopted throughout the training.

In some embodiments, to make CNN-based coded size estimation useful in real time video encoding, the exemplary CNN-based model 400 is integrated with the encoder (e.g., the model(s) 122 as part of the encoder 112, FIG. 1A), so that the video encoder invokes model inference directly. In other words, the encoder can access the trained CNN-based model 400 without calling any language binding APIs provided by machine learning platforms. For the integration, the trained model parameters are outputted to C or other programming language's header files in some embodiments. The encoder then performs direct model inferencing based on the raw model parameters and known model structure on the input features. Since the CNN-based model 400 for coded size estimation has more trained parameters than the MLP-based model 300 (FIG. 3) has, the cycle saving from the direct implementation in the CNN-based model 400 may be less significant than that in direct implementation of the MLP-based model 300.

Figure 5:
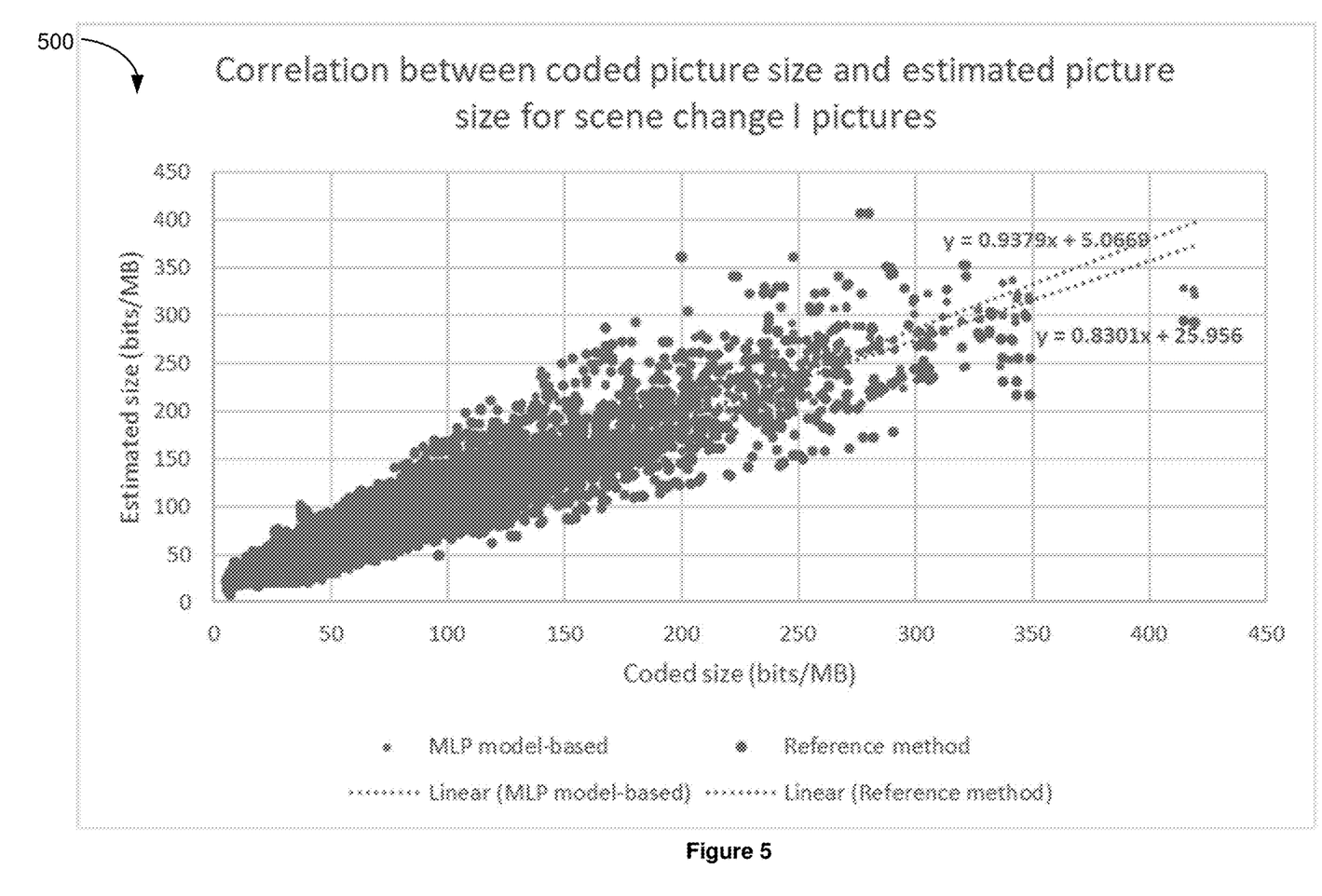
FIG. 5 illustrates the correlation between estimated coded sizes and actual coded sizes for MLP-based method in accordance with some embodiments and a reference method.

FIG. 5 is a graph 500 illustrating the correlation between estimated coded sizes and actual coded sizes for the MLP-based method described herein in accordance with some embodiments and a reference method. Coded size estimation accuracy can be evaluated by estimation error in percentage, i.e., (coded_size−predicted_size)/coded_size. The machine learning based estimation methods described herein are compared against a reference method. The reference method assumes a nonlinear relationship between the coded size and a quantization parameter (QP), e.g., coded_size=k*C/f(QP), where C is the complexity of a given picture, k is a coefficient to be estimated for different picture type and codec, and f is a function mapping for a given QP to codec-defined quantization level. After each picture has been coded, k is updated based on the actual coded size and corresponding C and QP for the given picture type and codec. Then, k is used to estimate the coded size for a picture to be encoded.

For AVC I-picture, the MLP-based model as described above with reference to FIGS. 2 and 3 is trained with a training set comprising more than 60,000 I-pictures from the selected training video sequences encoded at different bit rates and throttle levels. The MLP-based model is evaluated on 14,000 I-pictures from the holdout validation sequences with different bit rates and throttle levels. The CNN-based model as described above with reference to FIG. 4 is also trained with the same number of I-pictures and evaluated on the same 14,000 holdout I-pictures for MLP model validation.

Table 1 below shows the mean and standard deviation of the estimation error in percentage for the methods in comparison. Table 1 shows that the CNN-based model achieves a similar estimation accuracy as an MLP-based model, which is roughly a 7-8% improvement over the reference method, but the CNN-based model has a smaller standard deviation. Note that the CNN-based model is trained with a similar number of training samples as the MLP-based model even though it has much more trainable parameters. With an increased number of training samples, the coded size estimation accuracy of the CNN-based model is expected to improve further.

TABLE 1

Estimation performance of machine learned based coded size estimation methods against the reference method (I-picture)

| Estimation method | Mean of estimation error | Std of estimation error |
| --- | --- | --- |
| Reference method | 23.01% | 28.48% |
| MLP-based model | 15.46% | 23.78% |
| CNN-based model | 15.52% | 15.26% |

The reference method reasonably estimates the coded sizes for pictures within the same scene and performs worse for a subset of units, e.g., scene change pictures. To compare the estimation performance of machine learning based methods against the reference method on scene change I-pictures, all three methods are evaluated over the 4,000 scene change I-pictures in the validation dataset. Table 2 shows the mean and standard deviation of the estimation error in percentage for each method.

TABLE 2

Estimation performance of machine learning based coded size estimation methods against reference method (scene change I-picture)

| Estimation method | Mean of estimation error | Std of estimation error |
| --- | --- | --- |
| Reference method | 32.36% | 39.59% |
| MLP model based | 18.11% | 25.57% |
| CNN model based | 21.01% | 18.49% |

Table 2 above shows that for scene change I-pictures, the estimation accuracy improvement from machine learning based methods over the reference method is much higher, up to 11-14%. The reduction on standard deviation is also more significant. FIG. 5 shows the correlation between the estimated coded sizes and actual coded sizes for the MLP-based method and the reference method. As shown in FIG. 5, the MLP-based method achieves a higher correlation and has less over-estimation or under-estimation.

Figure 6:
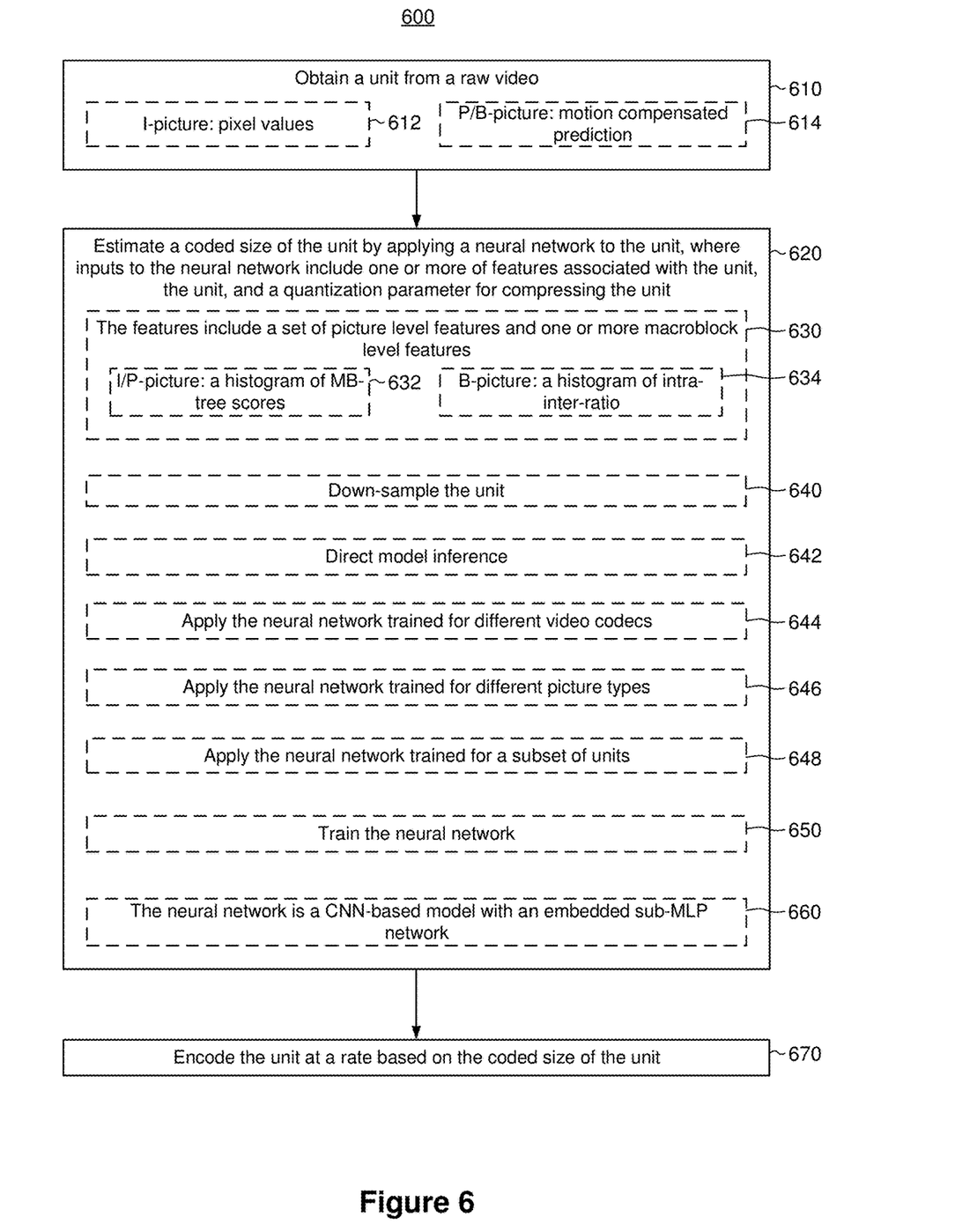
FIG. 6 is a flowchart illustrating a machine learning based coded size estimation method in rate control of video encoding, in accordance with some embodiments.

FIG. 6 is a flowchart illustrating a machine learning based coded size estimation method 600 in rate control of video encoding in accordance with some embodiments. In some embodiments, the method 600 is performed at an encoder, e.g., the encoder 112 in FIG. 1A. In some embodiments, the encoder includes one or more processor and at least one non-transitory storage. Briefly, the method 600 includes obtaining a unit from a raw video; estimating a coded size of the unit by applying a neural network to the unit, wherein inputs to the neural network include one or more of features associated with the unit, the unit, and a quantization parameter for compressing the unit; and encoding the unit at a rate based on the coded size of the unit.

To that end, as represented by block 610, the method 600 includes obtaining a unit from a raw video, e.g., obtaining an uncompressed image or picture from a raw video sequence. In some embodiments, the unit includes, as represented by block 612, pixel values of the unit, e.g., in the case of an I-picture. In some other embodiments, as represented by block 614, the unit includes motion compensated prediction of the unit, e.g., in the case of a P- or B-picture.

As represented by block 620, the method 600 further includes estimating a coded size of the unit by applying a neural network to the unit, where inputs to the neural network include one or more of features associated with the unit, the unit, and a quantization parameter for compressing the unit. In some embodiments, as represented by block 630, the features include a set of picture level features and one or more macroblock level features. For example, in FIG. 2, the plurality of features for the MLP-based model can include picture format, resolution type, encoding throttle level, picture complexity, pixel variance, pixel DC value, ratio of picture intra complexity over inter complexity of the temporal prediction, and/or picture QP, among others. Among these features, the picture complexity and pixel variance are normalized to the MB level 240 while other picture-wise features are at the picture level 220. In some embodiments, the one or more macroblock level features include a histogram of an adaptive quantization score, and in such embodiments, the method further includes determining a picture type of the unit. In accordance with a determination that the picture type is an I-picture or P-picture, as represented by block 632, the method 600 further includes obtaining a histogram of macroblock-tree scores for the unit as the histogram of the adaptive quantization score. On the other hand, as represented by block 634, in accordance with a determination that the picture type is a B-picture, the method 600 further includes obtaining a histogram of intra-inter-ratio (e.g., statistics of spatial and temporal complexities) for the unit at the macroblock level as the histogram of the adaptive quantization score.

In some embodiments, as represented by block 640, to reduce complexity, the method 600 further includes down-sampling the unit prior to applying the neural network to the unit. For example, in FIG. 4, for videos with a resolution of 1920×1080, the input luminance or residue is down-sampled to 240×136 and fed to the first convolution layer 420-1. Further, to improve efficiency so that the method 600 is useful in real time video encoding, the neural network is applied through direct model inference, as represented by block 642. In such embodiments, the method 600 further includes integrating the neural network with the encoder to reduce the overhead in model inference. With direct model inference, the encoder can obtain model parameters of the neural network, e.g., outputting to the encoder the trained model parameters in raw format to the header files of a targeted program language, and estimate the coded size of the unit using the model parameters of the neural network.

In some embodiments, as represented by block 644, the method 600 further includes determining a video codec for encoding the raw video, and selecting the neural network trained for the video codec to apply to the unit. As such, the neural network can be trained and applied to different video codecs, e.g., MPEG-2, AVC, HEVC, VVC, etc., for coded size estimation.

In some embodiments, as represented by block 646, the method 600 further includes determining a picture type of the unit, and selecting the neural network trained for the picture type to apply to the unit. As such, as shown in FIG. 2, the neural network can be trained and applied to different picture types, e.g., I-picture, P-picture, B-picture, etc., for coded size estimation.

In some embodiments, as represented by block 648, the method 600 further includes identifying a subset of units in the raw video, and applying the neural network to the subset of units to estimate a set of coded sizes for the subset of units. As such, the neural network can be trained and applied to a subset of pictures, e.g., scene change I-pictures, for coded size estimation. As shown in Table 2 and FIG. 5, the machine learning based coded size estimation reduces estimation error and has less over-estimation or under-estimation relative to the reference method.

In some embodiments, as represented by block 650, the method 600 further includes training the neural network. In some embodiments, training the neural network, e.g., for MLP-based and/or CNN-based model with an embedded sub MLP-based network, includes providing a set of coded sizes normalized to macroblock level and features of units from a video sequence to the neural network, and validating estimated sizes outputted by the neural network based on the set of coded sizes, including updating model parameters (e.g., weights) of the neural network until a set of updated model parameters has been identified, wherein using the set of updated model parameters, the estimated sizes satisfy an estimation accuracy threshold relative to the set of coded sizes. An exemplary training method is described in further detail below with reference to FIG. 7.

In some embodiments, as represented by block 660, the neural network is a CNN-based model with an embedded sub-MLP network, e.g., the exemplary CNN model 400 with the embedded sub-MLP network 405 in FIG. 4. As such, the neural network includes a set of sequentially coupled feature extraction layers for generating sub-features under different resolutions for different picture types based on the inputs, and multiple fully connected network layers (e.g. the dense layers 430, FIG. 4) for regression based on the sub-features (e.g., providing learning features from combinations of features of the previous layer). In some embodiments, one of the multiple fully connected network layers concatenates the sub-features (e.g., outputs from dense layer 2 430-2, FIG. 4), an output from a sub-neural network (e.g., the embedded sub-MLP network 405, FIG. 4), and the quantization parameter (e.g., from input layer 3 410-3, FIG. 4) before feeding to a next layer (e.g., dense layer 6, 430-6) of the multiple fully connected network layers, the sub-neural network includes an input layer (e.g., input layer 2 410-2) for receiving picture-wise features and a plurality of fully connected network layers (e.g., dense layer 3 430-3, dense layer 4 430-4, and dense layer 5 430-5).

The method 600 continues, as represented by block 670, with the encoder encoding the unit at a rate based on the coded size of the unit.

Figure 7:
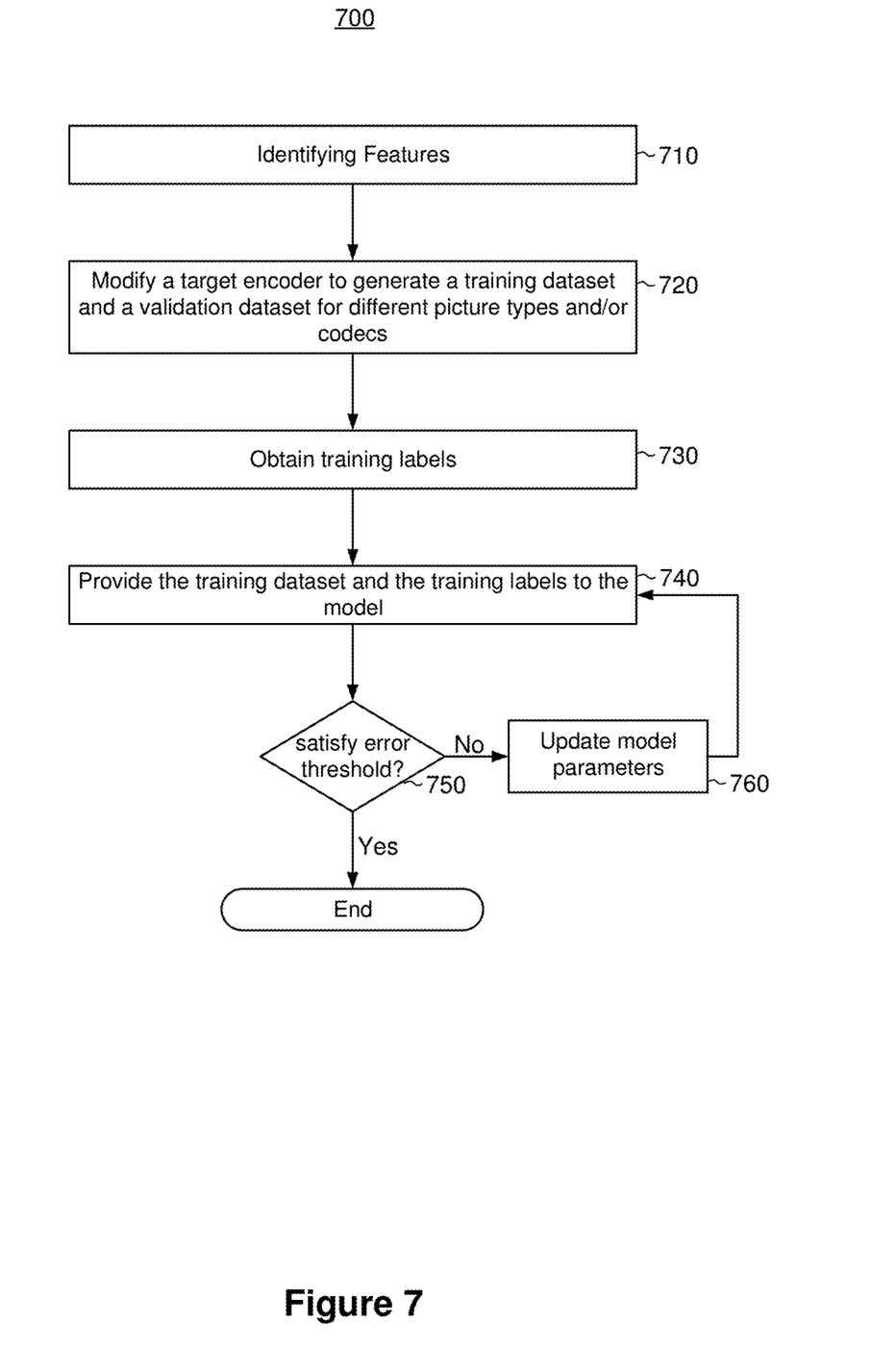
FIG. 7 is a flowchart illustrating a model training method, in accordance with some embodiments.

FIG. 7 is a flowchart illustrating a model training method 700 for machine learning based coded size estimation in rate control of video encoding in accordance with some embodiments. In some embodiments, the method 700 is performed by a training module, e.g., the training module 114 in FIG. 1B. It should be noted that the particular order in which the operations in FIG. 7 have been described is merely an example and is not intended to indicate that the described order is the only order in which the operations could be performed. One of ordinary skill in the art would recognize various ways to reorder the operations described herein. Further, steps illustrated in and described with respect to FIG. 7 may not be mandatory and thus some may be omitted in certain embodiments. For example, for CNN-model, the step(s) related to feature selection may be omitted in some embodiments. Additionally, some embodiments can include further or different steps beyond those illustrated in and described with respect to FIG. 7.

The training method 700 begins with the training module (e.g., the feature preparation module 170, FIG. 1B) identifying features in step 710. For instance, for the MLP-based model, as shown in FIG. 2, features at both the picture level 220 and the macroblock level 240 are identified for training different types of pictures, e.g., I-, P-, or B-picture. In another example, in FIG. 4, 9 input features for input layer 2 410-2 of the embedded sub-MLP network 405 are identified.

The training method 700 continues, in step 720, with the training module (e.g., the modification module 176, FIG. 1B) modifying a target encoder to generate a training dataset (e.g., as part of the training data 172, FIG. 1B) and a validation dataset (e.g., as part of the validation data 174, FIG. 1B) for different picture types and/or codecs. For instance, the training module instructs the target encoder to generate the training dataset and the validation dataset by encoding training video sequences and holdout validation video sequences at different bitrates and throttle levels. In some embodiments, in preparation for the training, the training module obtains training labels and test labels as the ground truth in step 730. For instance, for the encoded pictures, the actual coded sizes are collected and used by the modification module 176 as the training labels and by the verification module 178 as the test labels (FIG. 1B) during the supervised learning process 700.

In step 740, the training module provides the training dataset and the training labels to the model followed by step 750 with the training module checking the coded size estimation accuracy threshold. For example, the coded size estimation accuracy can be evaluated by estimation error in percentage, i.e., (coded_size−predicted_size)/coded_size. In some embodiments, in step 750, the training module determines whether the coded size estimation accuracy satisfies an error threshold, e.g., the estimation error in percentage is below a threshold. In the case of the coded size estimation accuracy satisfying the error threshold ("Yes"-branch from step 750), the training ends. In the case of the coded size estimation accuracy not satisfying the error threshold ("No"-branch from step 750), the training module (e.g., the modification module 176, FIG. 1B) updates a set of model parameters in step 760, e.g., adjusting weights in the neural network, and the iterative training process goes back to step 740. The iterative process continues until a set of updated model parameters has been identified such that using the set of updated model parameters, the estimation accuracy is above a certain level, e.g., with an estimation error rate below a threshold.

In some embodiments, the training module (e.g., the feature preparation module 170 in conjunction with the modification module 176 and/or the verification module 178, FIG. 1B) is also configured to evaluate (e.g., automatically, without human intervention, and/or without intervening step(s)) whether adjusting the inputs (e.g., size of histogram bins, number of features, etc.) and/or the configuration of the neural network improves estimation accuracy. For example, through the iterative training process, it reveals that using picture-wise features only does not achieve a competitive estimation accuracy. More pertinent features are identified for an MLP-based model training and inference. The training module obtains statistics from the MB level, synthesizes features from such statistics, and adds the synthesized features to the inputs for improved estimation accuracy. In another example, when using the exemplary CNN-based model 400 with the embedded MLP-based sub-network 405, as shown in FIG. 4, there are nine picture-wise features used in the exemplary CNN-based model 400 as inputs to the embedded sub-MLP network 405. Seven features of the inputs to input layer 2 410-2 are the same as the exemplary MLP-based model 300 (FIG. 3), while the resolution type from the list of features for the exemplary MLP-based model 300 is removed because the exemplary CNN-based model 400 is trained for each resolution. Further, two more picture-wise features (e.g., camera flash tag and fading tag) are added to the list of features to input layer 2 410-2 for improved estimation accuracy. As such, the training module assesses the estimation accuracy (e.g., whether below an error threshold) and automates the feature selection process for improved estimation accuracy.

Figure 8:
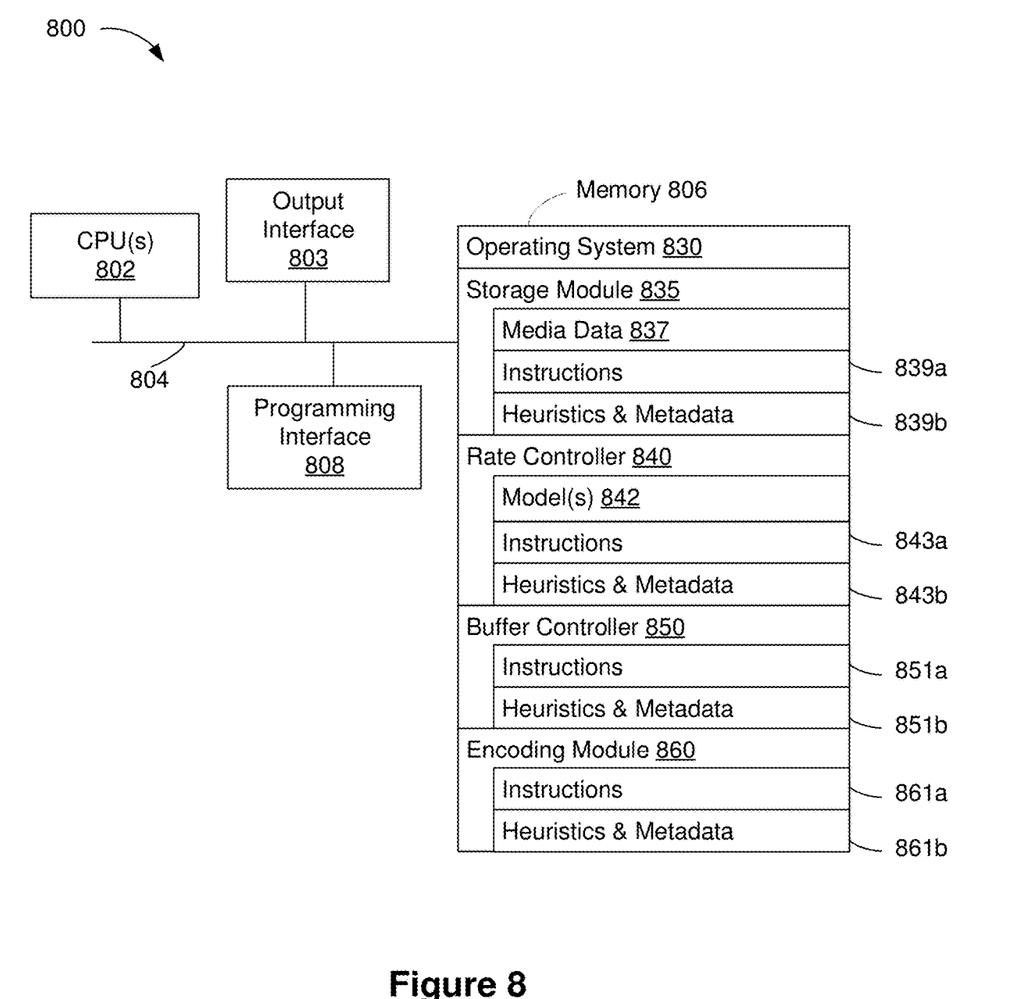
FIG. 8 is a block diagram of a computing device for machine learning based coded size estimation, in accordance with some embodiments.

FIG. 8 is a block diagram of a computing device 800 for machine learning based coded size estimation in accordance with some embodiments. In some embodiments, the computing device 800 corresponds to the encoder 112 in FIG. 1A and performs one or more of the functionalities described above with respect to the encoder 112. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 800 includes one or more processing units (CPU's) 802 (e.g., processors), one or more output interfaces 803 (e.g., a network interface), a memory 806, a programming interface 808, and one or more communication buses 804 for interconnecting these and various other components.

In some embodiments, the communication buses 804 include circuitry that interconnects and controls communications between system components. The memory 806 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 806 optionally includes one or more storage devices remotely located from the CPU(s) 802. The memory 806 comprises a non-transitory computer readable storage medium. Moreover, in some embodiments, the memory 806 or the non-transitory computer readable storage medium of the memory 806 stores the following programs, modules and data structures, or a subset thereof including an optional operating system 830, a storage module 835, a rate controller 840, a buffer controller 850, and an encoding module 860. In some embodiments, one or more instructions are included in a combination of logic and non-transitory memory. The operating system 830 includes procedures for handling various basic system services and for performing hardware dependent tasks.

In some embodiments, the storage module 835 is configured to store raw media data 837 for processing, e.g., obtained one or more units from the recorded content source 101a and/or the live broadcast 101b in FIG. 1A. To that end, the storage module 835 includes a set of instructions 839a and heuristics and metadata 839b.

In some embodiments, the rate controller 840 (e.g., the rate controller 120, FIG. 1A) is configured to use trained model(s) 842 (e.g., the model(s) trained by the training module 114 in FIGS. 1A and 1B) to estimate coded size estimation for rate control of video encoding. To that end, the rate controller 840 includes a set of instructions 843a and heuristics and metadata 843b.

In some embodiments, the buffer controller 850 is configured to maintain buffering level in conjunction with rate control by the rate controller 840, e.g., by simulating a decoder's VBV 130 model along with the LAB 140 as shown in FIG. 1A. To that end, the buffer controller 850 includes a set of instructions 851a and heuristics and metadata 851b.

In some embodiments, the encoding module 860 is configured to encode the media data 837 according to the estimated coded size by the rate controller 840 and/or the buffering level maintained by the buffer controller 850. To that end, the encoding module 860 includes a set of instructions 861a and heuristics and metadata 861b.

Although the storage model 835, the rate controller 840, the buffer controller 850, and the encoding module 860 are illustrated as residing on a single computing device 800, it should be understood that in other embodiments, any combination of the storage model 835, the rate controller 840, the buffer controller 850, and the encoding module 860 can reside in separate computing devices in various embodiments. For example, in some embodiments, each of the storage model 835, the rate controller 840, the buffer controller 850, and the encoding module 860 resides on a separate computing device.

Moreover, FIG. 8 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 8 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changes the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:
1. A method comprising:
at an encoder including a processor and a non-transitory memory:
providing a set of coded sizes normalized to macroblock level and providing features of units from a video sequence to a neural network;
validating estimated sizes outputted by the neural network based on the set of coded sizes, including updating model parameters of the neural network until a set of updated model parameters has been identified, wherein using the set of updated model parameters, the estimated sizes satisfy an estimation accuracy threshold relative to the set of coded sizes;
obtaining a unit from a raw video;
estimating a coded size of the unit by applying the neural network to the unit, wherein inputs to the neural network include one or more of features associated with the unit, the unit, and a quantization parameter for compressing the unit; and
encoding the unit at a rate based on the coded size of the unit.
2. The method of claim 1, wherein the unit includes pixel values of the unit or motion compensated prediction of the unit.
3. The method of claim 1, wherein the features include a set of picture level features and one or more macroblock level features of the unit.
4. The method of claim 3, wherein the one or more macroblock level features include a histogram of an adaptive quantization score, and the method further includes:
determining a picture type of the unit;
obtaining a histogram of macroblock-tree scores for the unit as the histogram of the adaptive quantization score in accordance with a determination that the picture type is an I-picture or P-picture; and
obtaining a histogram of intra-inter-ratio for the unit at the macroblock level as the histogram of the adaptive quantization score in accordance with a determination that the picture type is a B-picture.
5. The method of claim 1, further comprising downsampling the unit prior to applying the neural network to the unit.
6. The method of claim 1, further comprising:
integrating the neural network with the encoder;
obtaining, by the encoder, model parameters of the neural network; and
estimating the coded size of the unit based on the model parameters of the neural network and the inputs to the neural network.
7. The method of claim 1, further comprising:
determining a video codec for encoding the raw video; and
selecting the neural network trained for the video codec to apply to the unit.
8. The method of claim 1, further comprising:
determining a picture type of the unit; and
selecting the neural network trained for the picture type to apply to the unit.
9. The method of claim 1, further comprising:
identifying a subset of units in the raw video; and
applying the neural network to the subset of units to estimate a set of coded sizes for the subset of units.

10. The method of claim 1, wherein the neural network includes:
a set of sequentially coupled feature extraction layers for generating sub-features under different resolutions for different picture types based on the inputs; and
multiple fully connected network layers for regression based on the sub-features, wherein one of the multiple fully connected network layers concatenates the sub-features, an output from a sub-neural network, and the quantization parameter before feeding to a next layer of the multiple fully connected network layers, the sub-neural network includes an input layer for receiving picture-wise features and a plurality of fully connected network layers.
11. A device comprising:
a processor;
a non-transitory memory; and
one or more programs stored in the non-transitory memory, which, when executed by the processor, cause the device to:
provide a set of coded sizes normalized to macroblock level and providing features of units from a video sequence to a neural network;
validate estimated sizes outputted by the neural network based on the set of coded sizes, including updating model parameters of the neural network until a set of updated model parameters has been identified, wherein using the set of updated model parameters, the estimated sizes satisfy an estimation accuracy threshold relative to the set of coded sizes;
obtain a unit from a raw video;
estimate a coded size of the unit by applying the neural network to the unit, wherein inputs to the neural network include one or more of features associated with the unit, the unit, and a quantization parameter for compressing the unit; and
encode the unit at a rate based on the coded size of the unit.
12. The device of claim 11, wherein the unit includes pixel values of the unit or motion compensated prediction of the unit.
13. The device of claim 11, wherein the features include a set of picture level features and one or more macroblock level features of the unit.
14. The device of claim 11, wherein the one or more programs further cause the device to:
integrate the neural network with the device;
obtain model parameters of the neural network; and
estimate the coded size of the unit based on the model parameters of the neural network and the inputs to the neural network.
15. The device of claim 11, wherein the one or more programs further cause the device to:
determine a video codec for encoding the raw video; and
select the neural network trained for the video codec to apply to the unit.
16. The device of claim 11, wherein the one or more programs further cause the device to:
identify a subset of units in the raw video; and
apply the neural network to the subset of units to estimate a set of coded sizes for the subset of units.
17. The device of claim 11, wherein the neural network includes:
a set of sequentially coupled feature extraction layers for generating sub-features under different resolutions for different picture types based on the inputs; and multiple fully connected network layers for regression based on the sub-features, wherein one of the multiple fully connected network layers concatenates the sub-features, an output from a sub-neural network, and the quantization parameter before feeding to a next layer of the multiple fully connected network layers, the sub-neural network includes an input layer for receiving picture-wise features and a plurality of fully connected network layers.

18. A system comprising:

a non-transitory memory configured to store a neural network;

an encoder configured to:
provide a set of coded sizes normalized to macroblock level and providing features of units from a video sequence to the neural network;
validate estimated sizes outputted by the neural network based on the set of coded sizes, including updating model parameters of the neural network until a set of updated model parameters has been identified, wherein using the set of updated model parameters, the estimated sizes satisfy an estimation accuracy threshold relative to the set of coded sizes;
obtain a unit from a raw video;
estimate a coded size of the unit by applying the neural network to the unit, wherein inputs to the neural network include one or more of features associated with the unit, the unit, and a quantization parameter for compressing the unit; and
encode the unit at a rate based on the coded size of the unit.

19. The system of claim 18, wherein the encoder is further configured to:
determine a video codec for encoding the raw video; and
selecting the neural network trained for the video codec to apply to the unit.

20. The system of claim 18, wherein the encoder is further configured to:
determine a picture type of the unit; and
select the neural network trained for the picture type to apply to the unit.

* * * * *